Dec. 30, 1969   D. T. R. W. BARNES   3,486,407
BENDING AND CUTTING MACHINES
Filed Feb. 1, 1968   2 Sheets-Sheet 1
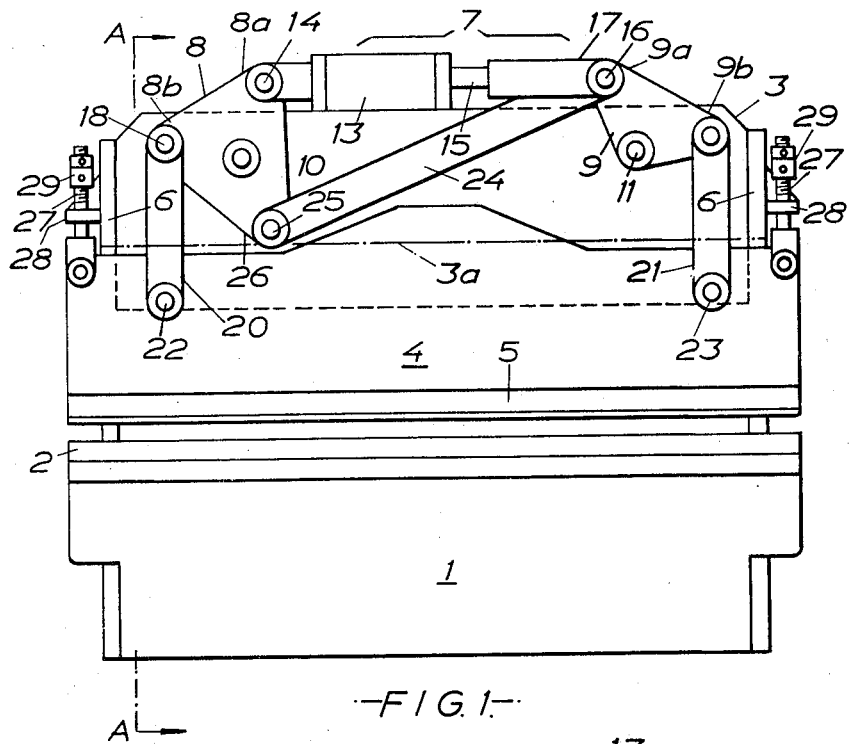
—FIG. 1.—
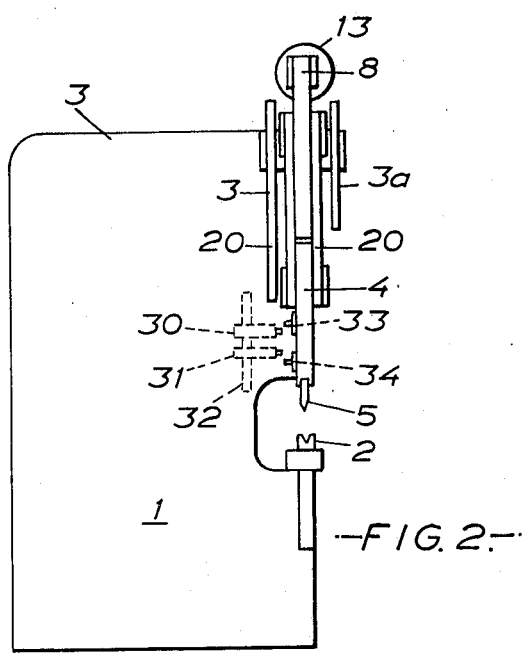
—FIG. 2.—

United States Patent Office 3,486,407
Patented Dec. 30, 1969

3,486,407
BENDING AND CUTTING MACHINES
Douglas T. R. W. Barnes, Cleckheaton, England, assignor to Douglas Barnes Limited, Heckmondwike, Yorkshire, England, a British company
Filed Feb. 1, 1968, Ser. No. 702,372
Claims priority, application Great Britain, Feb. 2, 1967, 5,125/67
Int. Cl. B26d 5/18
U.S. Cl. 83—630
8 Claims

ABSTRACT OF THE DISCLOSURE

A machine of the type including a movable tool carrying beam guided to reciprocate in a straight line to move a tool relative to a fixed tool for cutting or for bending plates or sheets, and characterised in the provision of a fluid pressure operated piston-cylinder unit slung between bell crank levers which are pivoted on the machine frame with operating links depending from the levers and anchored to the movable beam, and an angled tie-link between the bell crank levers for effort transfer purposes.

---

This invention relates to bending and cutting machines, such as press brakes, guillotines and shearing machines, wherein one tool-carrying beam moves in relation to another tool, or table. Said tools may be for folding or shaping or cutting sheets or plates.

The terms "fixed" and "movable" tools as herein used in a general sense are intended to include bending tools or blades.

According to the present invention there is provided a machine for bending or cutting sheets or plates, wherein the movable tool carrying beam is operated by a single fluid operated piston cylinder unit slung between two bell crank levers pivoted to the machine frame, said unit being adapted to move said levers in opposite directions (clockwise and anti-clockwise), an operating link pivoted to each lever and pivotally anchored to said movable beam, and an angled tie-link extending between one of said bell crank levers where it is connected to the aforesaid unit and an integral tail part extending radially from the pivot of the second bell crank lever for effort transfer purposes.

The movable beam operating means may include an eccentric adjustment device in the beam anchorage of at least one of the operating links.

The movable beam may be limited in its operating stroke by mechanical adjustable stop means. The stroke of the movable beam may be controlled by a pair of electrical limit switches, each adjustable positionally, which control valve means.

The aforesaid bell crank levers may both have their link and piston-cylinder unit connection axes spaced equidistant from the lower axes. Alternatively, the radius for the link connection axis on one lever may be fractionally greater than the remaining radii of both levers to ensure parallel movement of the beam tool relative to the fixed tool during the final closing stroke of the movable tool.

The invention will now be more particularly described with reference to the accompanying substantially diagrammatic drawings, in which:

FIG. 1 is a front view of a hydraulic press embodying the improved operating means;

FIG. 2 is a cross sectional view on line A—A of FIG. 1;

Figure 3:
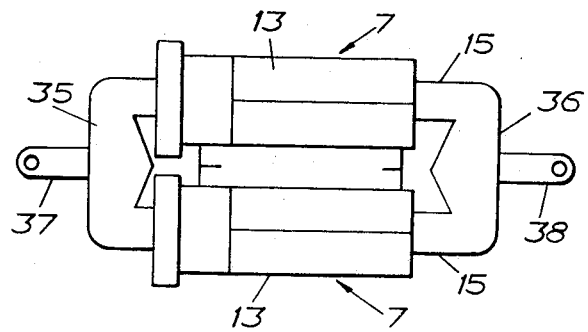
FIG. 3 is a detail of modified operating means comprising a tandem pair of piston-cylinder units.

In a particular embodiment of this invention, FIGS. 1 and 2, a press brake is constructed with a bed part 1 supporting a bending tool 2, referred to as a fixed tool, which can be removably mounted for interchangement purposes. This tool is of single groove form but can be of known multi-grooved formation for different bending operations. The upper structure 3 of the machine is provided with a movable beam 4 furnished with a bending tool 5 and with guide means 6 for its reciprocating movements. The front cross member 3a is removed in FIG. 1 for illustrative purposes.

The means for operating the beam 4 comprise a single hydraulic piston and cylinder unit 7 slung horizontally between a pair of bell crank levers 8 and 9 which are pivotally mounted at 10 and 11 on the fixed structure 3 of the machine. The cylinder 13 is pivotally anchored at 14 to the upwardly projecting arm 8a of the lever 8 and the piston 15 is pivotally attached at 16 by a forked member 17 to the upwardly projecting arm 9a of the other lever 9. The other two arms 8b and 9b of the bell-crank levers 8 and 9 project outwardly away from one another for the pivotal attachment at 18 and 19 of links 20 and 21. Thus when the piston 15 is thrust from the cylinder 13 the unit will turn the lever 9 clockwise and the other lever 8 anti-clockwise. For this reason the radii for the pivotal connection axes 14 and 18 of the arms of the lever 8 are equal whilst the radius for the pivotal connection 16 for the other lever 9 to the piston end 17 is of equal distance to the first radii for lever 8 whilst the outwardly projecting radius for the link connection 19 is fractionally greater than these three radii. The double links 20, 21 from each lever 8, 9 hang pendantly for pivotal connection at 22, 23 to the movable beam 4 and preferably one connection, say 23, to the beam incorporates an eccentric which will allow fractional adjustment of the beam 4 about the axis of the other link connection 22 to the beam. This is for setting purposes of the tool 5 carried by the movable beam 4 in relation to the fixed tool 2. For effort transfer purposes a tie-link 24, it may be double, extends from the bell crank lever 9, where it is pivotally connected at 16 to the piston of the piston-cylinder unit 7, at an angle downwardly to a pivotal connection 25 to an integral tail piece 26 of the other bell crank lever 8. This latter connection 25 of the tail piece is equal in its radius to the other two radii to connections 14, 18 of that bell crank lever.

With the above arrangement the movable beam 4 is operated in its downward and upward strokes by a single piston-cylinder unit 7 through bell crank levers 8 and 9 and links 20 and 21. Moreover, by making the aforesaid link connection radius of one lever greater than the remaining radii, the difference is calculated to suit the mechanism and machine, it ensures that although the movable beam 4 commences its stroke with a slight difference of movement between the two ends of the movable tool 5, it automatically corrects itself in the last part of the stroke so that the two tools 2 and 5 will be in accurate parallel alignment. The eccentric at connection 23 is only provided for setting purposes, such as to correct any slight machining error, or to set the movable tool at a slight angle of rake if this is desired for a bending operation.

In addition to the above, the movable beam 4 is furnished with an adjustable dead stop device 27 at each end. This dead stop comprises an upright screw pivotally connected at its bottom end to the beam and passing through a fixed stop member 28 which is engageable by an adjustable collar 29 on the screw which can be furnished with a lock nut or collar. Graduations can be furnished for setting purposes. These mechanical stop means enable the movable beam to be positively arrested at any desired level in relation to the fixed tool 2.

The stroke of the movable beam is also controlled by providing a pair of electrical limit switches 30, 31 which are adjustably mounted on a rod 32 to be engageable by means 33, 34 on the movable beam. Thus the switches can be tripped automatically to control valve means in the hydraulic system so that the upward and downward limits of the movable beam are adjustable at will.

It will be understood the above principle and mechanism can be used for guillotines and shearing machines, but in that instance it is not necessary to provide the fractional difference in radius for one arm of the bell crank levers. Also, the dead stop devices 27 are eliminated and work "hold downs" provided.

It is an important function of the angle link 24 between the two bell crank levers 8 and 9 to transfer cylinder effort from one bell crank to the other thereby combining full cylinder effort to any one side of the movable beam. This is of particular importance when the mechanisms are applied to guillotines and shearing machines. Total effort is required at one side, moving to centre and then to the other side.

Figure 4:
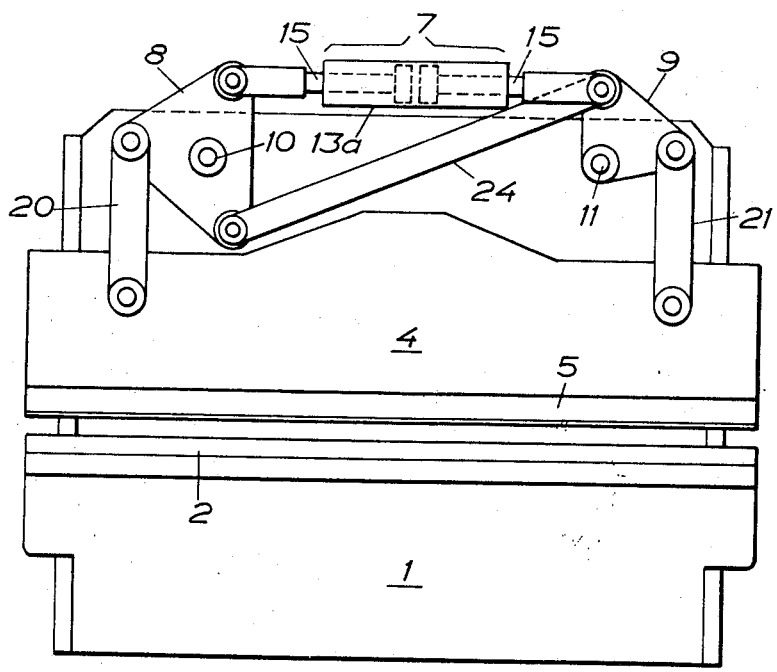
FIG. 4 is a detail of a further modified operating means of a double piston unit.

The term "single piston-cylinder unit" is intended to include its equivalent in the form of a tandem pair of side-by-side units 7 having their rods and cylinders respectively joined together by links 35, 36 at each end of the double unit, which links are connected by members 37 and 38 to the levers 8 and 9. If desired one cylinder may be connected to lever 8 and the other cylinder to lever 9. Also, FIG. 4, the unit may be a single cylinder 13a with two oppositely directed pistons 15 each connected to one of the levers 8 and 9.

What I claim is:

1. Machine for bending or cutting sheets or plates, including a machine frame, a movable tool carrying beam, guide means for causing the beam to have vertical straight line movements on said frame, a pair of bell crank levers pivotally mounted on said frame, a fluid operated piston-cylinder unit slung between and pivotally connected to said bell crank levers to move them oppositely to one another both clockwise and anti-clockwise, pendant operating link means also pivotally connected to said bell crank levers and to the movable beam, angled tie-link means pivotally anchored at its upper end to one of said bell crank levers on the axis where the piston-cylinder unit is connected, the lower end of said tie-link being pivotally anchored to an integral radially extending tail part of the other bell crank lever, said tie-link means being arranged to form effort transfer means between the bell crank levers, and a fixed tool on the machine frame to co-operate with the movable tool.

2. Machine according to claim 1, wherein the piston-cylinder unit is mounted horizontally and pivotally connected to the upstanding arms of the two bell crank levers.

3. Machine according to claim 1, wherein the movable beam operating means include an eccentric adjustment device in the beam anchorage of at least one of the operating links.

4. Machine according to claim 1, wherein the movable beam is limited in its operating stroke by mechanical adjustable stop means.

5. Machine according to claim 1, wherein the bell crank levers both have their link and piston-cylinder unit connection axes spaced equi-distant from the lever axes.

6. Machine according to claim 1, wherein the radius for the link connection axis on one lever is fractionally greater than the remaining radii of both levers to ensure parallel movement of the beam tool relative the fixed tool during the final closing stroke of the movable tool.

7. Machine according to claim 1, wherein the piston-cylinder unit comprises a pair of side-by-side units linked at both ends for combined effort.

8. Machine according to claim 1, wherein the piston-cylinder unit includes two oppositely acting pistons.

References Cited

UNITED STATES PATENTS 2,814,346 11/1957 Jauss _____ 83—630 X
3,389,627 6/1968 Morley _____ 83—630 X

FOREIGN PATENTS 1,184,400 7/1959 France.

WILLIAM S. LAWSON, Primary Examiner

U.S. Cl. X.R.

72—451